United States Patent
Yu

(10) Patent No.: US 11,623,997 B2
(45) Date of Patent: Apr. 11, 2023

(54) WATER-BASED INK AND PRINTING FILM COMPRISING THE SAME

(71) Applicant: TAI CHANG COLORFUL PRESS INDUSTRIAL CO., LTD., Taichung (TW)

(72) Inventor: Chen Wei Yu, Taichung (TW)

(73) Assignee: TAI CHANG COLORFUL PRESS INDUSTRIAL CO., LTD., Taichung (TW)

( * ) Notice: Subject to any disclaimer, the term of this patent is extended or adjusted under 35 U.S.C. 154(b) by 287 days.

(21) Appl. No.: 17/095,781

(22) Filed: Nov. 12, 2020

(65) Prior Publication Data

US 2022/0081579 A1   Mar. 17, 2022

(30) Foreign Application Priority Data

Sep. 14, 2020   (TW) .................. 109131496

(51) Int. Cl.
| | | |
|---|---|---|
| *C09D 11/107* | (2014.01) | |
| *C09D 7/65* | (2018.01) | |
| *C09D 11/037* | (2014.01) | |
| *C09D 11/102* | (2014.01) | |

(52) U.S. Cl.
CPC ............ *C09D 11/107* (2013.01); *C09D 7/65* (2018.01); *C09D 11/037* (2013.01); *C09D 11/102* (2013.01)

(58) Field of Classification Search
None
See application file for complete search history.

(56) References Cited

U.S. PATENT DOCUMENTS 8,186,822 B2 *   5/2012   Li .................. 347/100

FOREIGN PATENT DOCUMENTS

| CN | 105131709 A | | 12/2015 | | |
|---|---|---|---|---|---|
| CN | 106084990 A | | 11/2016 | | |
| CN | 106634188 A | | 5/2017 | | |
| CN | 107384011 A | | 11/2017 | | |
| CN | 107384013 A | | 11/2017 | | |
| CN | 107502055 A | * | 12/2017 | ............ | C09D 11/03 |
| CN | 107828277 A | | 3/2018 | | |
| CN | 108997838 A | | 12/2018 | | |
| CN | 110669378 A | | 1/2020 | | |
| CN | 110669379 A | | 1/2020 | | |
| CN | 110978836 A | | 4/2020 | | |
| CN | 111019434 A | | 4/2020 | | |
| CN | 111334119 A | * | 6/2020 | ............ | C09D 11/03 |
| JP | 4275225 B2 | * | 6/2009 | ............ | C09D 11/18 |
| WO | 2016/111718 A1 | | 7/2016 | | |

OTHER PUBLICATIONS

CN111334119A English Translation (Year: 2020).*
JP4275225B2 English Translation (Year: 2009).*
CN107502055A ENglish Translation (Year: 2017).*
SIXIN News/the difference between polyether modified silicon, polyether and silicon defoaming agent, 2019 http://www.sixindefoam.com/news/silicone-defoaming-agent-2. (Year: 2019).*

* cited by examiner

*Primary Examiner* — Ling Siu Choi
*Assistant Examiner* — Huihong Qiao
(74) *Attorney, Agent, or Firm* — WPAT, PC

(57) ABSTRACT

A water-based ink comprises an ink raw material, water, a resin, a desiccant, a defoamer, a hardener, a color fixative, and a dispersant. Based on the total volume of the water-based ink, the ink raw material has an amount of from 10 volume percentage (vol %) to 15 vol %, the water has an amount of from 60 vol % to 67 vol %, the resin has an amount of from 6 vol % to 12 vol %, the desiccant has an amount of from 5 vol % to 10 vol %, the defoamer has an amount of from 3 vol % to 8 vol %, the hardener has an amount of from 4 vol % to 9 vol %, the color fixative has an amount of from 2 vol % to 7 vol %, and the dispersant has an amount of from 3 vol % to 9 vol %. The printing film produced by the water-based ink is suitable for plastic flooring.

8 Claims, No Drawings

WATER-BASED INK AND PRINTING FILM COMPRISING THE SAME

CROSS-REFERENCE TO RELATED APPLICATION

Pursuant to 35 U.S.C. § 119(a), this application claims the benefit of the priority to Taiwan Patent Application No. 109131496 filed on Sep. 14, 2020. The content of the prior application is incorporated herein by its entirety.

BACKGROUND OF THE INVENTION

1. Field of the Invention

The invention relates to an ink and a material film thereof, particularly, a printing film suitable for plastic flooring.

2. Description of the Prior Arts

Flooring is one of the common decoration materials used in buildings, and the flooring can be tile flooring, vinyl flooring, and the like. The use of plastic flooring instead of natural materials such as wood can reduce the damage to the natural environment, so flooring made of plastic is the current development trend of flooring products.

Common plastic flooring has a layered structure, from bottom to top, comprising a substrate, a printing film, and a wear-resistant film, wherein the printing film comprising a PVC film and a solidified ink layer formed thereon is used for decoration of the plastic flooring. Most of the current printing films are colored with oil-based inks. However, the oil-based inks contain volatile organic solvents, so plastic flooring comprising a printing film made of the oil-based inks will result in many problems related to toxicity and environmental protection. In addition, since the oil-based inks dry very fast during the adhering process of plastic flooring, the produced plastic flooring suffers from poor quality.

To overcome the aforesaid problems, water-based inks are developed to replace the oil-based inks to solve the problems caused by the oil-based inks. However, since the solvent of the water-based inks is water, the water-based inks cannot be easily dried. Hence, when printing films made of the water-based inks are used to produce plastic flooring, the plastic flooring suffers from poor color printing quality. In addition, the printing films made of the water-based inks are too tacky, and the water-based inks contained therein stain when the printing films are rolled and unrolled. In addition, to deal with the toxicity caused by organic solvents, the printing films made of the water-based inks must not contain any organic solvent. Moreover, to extend the lifespan of the printing films, the pulling force required to remove the layer formed by a solidified water-based ink from the PVC film must be greater than 6 kilograms (kg) to give the printing film a considerable level of adhesion. Therefore, it is necessary to improve and develop other water-based inks to solve the aforementioned problems.

SUMMARY OF THE INVENTION

In view of the above problems, one of the objectives of the present invention is to develop a water-based ink, so that the printing film produced by the water-based ink can maintain a considerable level of adhesion and have characteristics of drying easily as well as good color printing quality. In addition, the water-based ink contained therein does not stain when the printing film is rolled and unrolled.

Another objective of the present invention is to develop a water-based ink, so that the printing film produced by the water-based ink is suitable for plastic flooring.

In order to achieve the objectives, the present invention provides a water-based ink, which comprises an ink raw material, water, a resin, a desiccant, a defoamer, a hardener, a color fixative, and a dispersant. Based on the total volume of the water-based ink, the ink raw material has an amount of from 10 volume percentage (vol %) to 15 vol %, the water has an amount of from 60 vol % to 67 vol %, the resin has an amount of from 6 vol % to 12 vol %, the desiccant has an amount of from 5 vol % to 10 vol %, the defoamer has an amount of from 3 vol % to 8 vol %, the hardener has an amount of from 4 vol % to 9 vol %, the color fixative has an amount of from 2 vol % to 7 vol %, and the dispersant has an amount of from 3 vol % to 9 vol %.

By controlling the compositions of the water-based ink, the printing film produced by the water-based ink has advantages of drying easily, good color printing quality, and low tacky level while a considerable level of adhesion is maintained, thus being suitable for plastic flooring.

According to the present invention, the ink raw material comprises, but not limited to, water-based paint pigments. Colors of the water-based paint pigments can be, but are not limited to, red, blue, yellow, black, or a combination thereof.

According to the present invention, the resin may be a resin for water-based inks. For example, the resin includes, but not limited to, polyurethane, poly(methyl methacrylate), or a combination thereof. Preferably, the resin includes polyurethane or poly(methyl methacrylate).

According to the present invention, the desiccant includes a water-based alkyd drier.

According to the present invention, the defoamer may be, but is not limited to, a defoamer for water-based paints. Preferably, the defoamer for water-based paints includes polyether siloxane.

According to the present invention, the hardener includes polyamide.

Preferably, based on the total volume of the water-based ink, the ink raw material has an amount of from 10 vol % to 13 vol %, the water has an amount of from 60 vol % to 65 vol %, the resin has an amount of from 6 vol % to 10 vol %, the desiccant has an amount of from 5 vol % to 7 vol %, and the defoamer has an amount of from 3 vol % to 5 vol %.

Preferably, based on the total volume of the water-based ink, the hardener has an amount of from 4 vol % to 6 vol %, the color fixative has an amount of from 2 vol % to 5 vol %, and the dispersant has an amount of from 3 vol % to 5 vol %.

In order to achieve the objectives, the present invention further provides a printing film, which is produced by the aforesaid water-based ink.

According to the present invention, the printing film may be produced by gravure printing.

According to the present invention, the printing film may be produced at a temperature from 45° C. to 65° C.; preferably, the printing film may be produced at a temperature from 45° C. to 60° C.; more preferably, the printing film may be produced at a temperature from 50° C. to 60° C.; even more preferably, the printing film may be produced at a temperature from 50° C. to 55° C.

According to the present invention, the printing film may be produced at a pressure of 0.15 megapascals (MPa) to 0.45 MPa; preferably, the printing film may be produced at a pressure of 0.15 MPa to 0.40 MPa; more preferably, the printing film may be produced at a pressure of 0.20 MPa to 0.40 MPa.

According to the present invention, the printing film may be produced at a transport speed from 80 meters per second (m/s) to 115 m/s; preferably, the printing film may be produced at a transport speed from 90 m/s to 115 m/s; more preferably, the printing film may be produced at a transport speed from 95 m/s to 110 m/s.

According to the present invention, a pulling force of the printing film is more than 6 kilograms (kg); preferably, the pulling force of the printing film is more than 6 kg and less than 8.3 kg; more preferably, the pulling force of the printing film is more than or equal to 6.5 kg and less than 8.3 kg; even more preferably, the pulling force of the printing film is more than or equal to 7 kg and less than 8.3 kg; still more preferably, the pulling force of the printing film is more than or equal to 7.5 kg and less than 8.3 kg; yet still more preferably, the pulling force of the printing film is more than or equal to 7.8 kg and less than 8.3 kg; even further preferably, the pulling force of the printing film is more than or equal to 8.0 kg and less than 8.3 kg.

In summary, the printing film produced by the water-based ink of the present invention is characterized by drying easily, low tacky level, and good color printing quality while a considerable level of adhesion is maintained, thus being suitable for plastic flooring.

DETAILED DESCRIPTION OF THE PREFERRED EMBODIMENTS

A person skilled in the art can easily realize the advantages and effects of the present invention from the following examples and comparative examples. The descriptions proposed herein are just preferable embodiments for the purpose of illustrations only, not intended to limit the scope of the present invention. Various modifications and variations could be made in order to practice or apply the present invention without departing from the spirit and scope of the invention.

Raw Materials 1. red ink raw material: purchased from Easchem Co., Ltd.; product model: Xfast® Red 2817; pigment content: 75%;
2. blue ink raw material: purchased from Easchem Co., Ltd.; product model: Xfast® Blue 7080; pigment content: 80%;
3. yellow ink raw material: purchased from Easchem Co., Ltd.; product model: Xfast® Yellow 1102; pigment content: 85%;
4. black ink raw material: purchased from Easchem Co., Ltd.; product model: Xfast® Black 0066; pigment content: 70%;
5. pure water: purchased from Taiwan East Asia Water Purification Co., Ltd.;
6. resin: a resin comprising waterborne polyurethane and poly(methyl methacrylate); purchased from Gelie Co., Ltd.; product model: GA-3246;
7. desiccant: a desiccant comprising drier, water-based alkyd resin, titanium dioxide, an anti-blocking agent, as well as a wetting and dispersing agent; purchased from Wuxi Handerson Chemical Products Co., Ltd.; product model: HD-S02A;
8. defoamer: polyether siloxane; purchased from Hefei Xinwancheng Environmental Protection Technology Co., Ltd.; product model: XWC-T125;
9. hardener: polyamide; purchased from Ya Chung Industrial Co., Ltd.; product model: 2535;
10. color fixative: purchased from Beta Chemical Co., Ltd.; product model: B-40; and
11. dispersant: purchased from Guangzhou YaChuang New Material; product model: SN-5027.

Examples 1 to 3 and Comparative Examples 1 to 4: Water-Based Inks

The water-based inks of Examples 1 to 3 and Comparative Examples 1 to 4 were produced by the method described below using appropriate amounts of the ink raw material, the pure water, the resin, the desiccant, the defoamer, the hardener, the color fixative, and the dispersant. In Table 1, the amounts of the components of the water-based inks were expressed in volume percentage (vol %), and the ink raw material of the water-based inks of Examples 1 to 3 and Comparative Examples 1 to 4 were obtained by the formula consisting of 56 vol % of the red ink raw material, 11 vol % of the blue ink raw material, 29 vol % of the yellow ink raw material, and 4 vol % of the black ink raw material.

In the process of producing the water-based inks, the ink raw material, the resin, and the desiccant were firstly added to the pure water and then stirred for 15 minutes to obtain a first mixed solution.

Subsequently, the hardener and the color fixative were added to the first mixed solution and then stirred for 15 minutes to obtain a second mixed solution. Next, the defoamer and the dispersant were added to the second mixed solution and then stirred for 30 minutes to obtain a third mixed solution.

Finally, the third mixed solution was filtered with a 150-mesh filter with a pore size of 0.149 millimeters to remove solids with a relatively large particle diameter in the third mixed solution. The filtered solution stood still at normal pressure and 25° C. for 1 hour to remove bubbles. After that, the water-based inks of Examples 1 to 3 and Comparative Examples 1 to 4 were obtained.

Examples 1A to 3A and Comparative Examples 1A to 4A: Printing Films

The printing films of Examples 1A to 3A and Comparative Examples 1A to 4A were produced by the method described below using the above water-based inks of Examples 1 to 3 and Comparative Examples 1 to 4.

First, the water-based inks of Examples 1 to 3 and Comparative Examples 1 to 4 were each applied to a surface of a polyvinyl chloride (PVC) film (purchased from Guangzhou Han Rigid Plastics Corporation) by gravure printing to obtain semi-finished products with a length of 1 meter and a width of 1 meter. Next, each of the semi-finished products was placed on a printing machine (model: GT-GPA; purchased from GLOBAL TECH. (LN) CO., LTD.) and then printed at a transport speed from 95 meters per second (m/s) to 130 m/s at a temperature of 34° C. to 55° C. and a pressure of 0.2 megapascals (MPa) to obtain the printing films of Examples 1A to 3A and Comparative Examples 1A to 4A.

Herein, the parameters for manufacturing the printing films of Examples 1A to 3A and Comparative Examples 1A to 4A were shown in Table 1 below, wherein the transport speed referred to the speed of the conveyor belt of the printing machine on which each semi-finished product was put, and the temperature referred to the temperature of the printing machine in which each semi-finished product was printed. In addition, the pressure of 0.2 MPa in the printing process referred to the pressure applied to each semi-finished product in the printing machine.

TABLE 1

Compositions of water-based inks of Comparative Examples 1 to 4 (C1 to C4) and Examples 1 to 3 (E1 to E3) and values of parameters for producing printing films from the aforesaid water-based inks

| Sample No. | Ink Raw Material (vol %) | Pure Water (vol %) | Resin (vol %) | Desiccant (vol %) | Defoamer (vol %) | Hardener (vol %) | Color Fixative (vol %) | Dispersant (vol %) | Parameters of Printing Films Transport Speed (m/s) | Temperature (° C.) |
|---|---|---|---|---|---|---|---|---|---|---|
| C1 | 12.0 | 71.5 | 13.0 | 3.0 | 0.5 | — | — | — | 130 | 34 |
| C2 | 12.0 | 68.0 | 11.5 | 3.5 | 1.5 | — | 1.5 | 2.0 | 125 | 37 |
| C3 | 11.5 | 64.7 | 10.0 | 4.3 | 2.5 | 3.0 | 2.0 | 2.0 | 120 | 40 |
| C4 | 11.0 | 62.3 | 9.6 | 4.7 | 3.2 | 4.5 | 2.4 | 2.3 | 115 | 46 |
| E1 | 10.7 | 61.4 | 8.5 | 5.0 | 3.4 | 4.8 | 2.8 | 3.4 | 110 | 51 |
| E2 | 10.3 | 60.0 | 7.8 | 5.0 | 3.6 | 5.2 | 4.1 | 4.0 | 100 | 55 |
| E3 | 10.0 | 62.2 | 6.5 | 5.0 | 3.8 | 5.0 | 3.5 | 4.0 | 95 | 55 |

Test Example 1: Numbers of Bubbles

In this test example, each of the water-based inks of Examples 1 to 3 and Comparative Examples 1 to 4 was firstly placed in the ink tank (length: 130 centimeters (cm), width: 50 cm, depth: 15 cm) of the printing machine. Subsequently, at any time point during the printing process, the surface of the water-based ink in the ink tank was observed by an evaluator with naked eyes, and the number of the bubbles with a diameter greater than or equal to 0.5 cm on the surface was counted. When the number of the bubbles with a diameter greater than or equal to 0.5 cm was greater than or equal to 10, the number was considered large and was marked as "more" in Table 2. When the number of the bubbles with a diameter greater than or equal to 0.5 cm was less than 10, the number was considered small and was marked as "less" in Table 2. When no bubble with a diameter greater than or equal to 0.5 cm was observed, the number of the bubbles was marked as "none" in Table 2.

As shown in Table 2 below, the numbers of the bubbles of the water-based inks of Examples 1 to 3 were marked as "less" or "none", which meant the numbers of the bubbles with a diameter greater than or equal to 0.5 cm of the water-based inks of Examples 1 to 3 were all less than 10, and in particular, no bubble with a diameter greater than or equal to 0.5 cm was observed on the surface of the water-based ink of Example 3 in the ink tank. Therefore, the printing films produced by the water-based inks of Examples 1 to 3 had a uniform color and were suitable for plastic floorings. On the contrary, the numbers of the bubbles with a diameter greater than or equal to 0.5 cm of the water-based inks of Comparative Examples 1 and 2 were all greater than or equal to 10, so the printing films produced by the water-based inks of Comparative Examples 1 and 2 suffered from color non-uniformity. In addition, a large number of the bubbles with a diameter greater than or equal to 0.5 cm affected the fluidity of the water-based inks, so the efficiency of manufacturing the printing films was reduced, and the resulting printing films were not suitable for plastic flooring.

Test Example 2: Dryness

In this test example, the printing films of Examples 1A to 3A and Comparative Examples 1A to 4A were used as test samples. The test samples were placed in an environment with a pressure of 0.2 MPa, a humidity of 65%, and a temperature of 30° C. for 1 minute for drying. Next, the dryness of the surface or the ink under the surface of the printing films was sensed by an evaluator to evaluate the dryness of the printing films. The detailed evaluation process of this test example was described as follows.

After test samples were dried in the aforesaid environment for 1 minute, the surface of each of the test samples was touched by the evaluator with a finger. When the water-based ink did not stain the evaluator's finger and the surface of the test sample was considered hard, it meant that the surface and the ink under the surface of the test sample were deemed dried. This indicated that the dryness of the test sample was excellent, and it was marked as "O" in Table 2. When the water-based ink did not stain the evaluator's finger but the surface of the test sample was considered soft, it meant that the surface of the test sample was judged as dried but the ink under the surface of the test sample was not dried yet. This indicated that the dryness of the test example was good, and it was marked as "Δ" in Table 2. When the water-based ink stained the evaluator's finger, it meant that the surface and the ink under the surface were not dried yet. This indicated that the dryness of the test example was poor, and it was marked as "X" in Table 2.

As shown in Table 2 below, the dryness of the printing films of Examples 1A to 3A was at least good; in particular, the dryness of the printing films of Examples 2A and 3A were excellent. Hence, it was understood that the water-based inks of Examples 1 to 3 were suitable to produce printing films which could be applied to plastic flooring. On the contrary, the dryness of the printing films of Comparative Examples 1A to 4A was poor. Therefore, it was understood that the printing films produced by the water-based inks of Comparative Examples 1 to 4 were not suitable for plastic flooring.

The experimental results of Test Example 2 have shown that the dryness of the printing films of Examples 1A to 3A was superior to the dryness of the printing films of Comparative Examples 1A to 4A. Therefore, the printing films of Examples 1A to 3A made of the water-based inks of Examples 1 to 3 provided good color printing quality and thus were suitable for plastic flooring.

Test Example 3: Pulling Force

In this test example, the printing films of Examples 1A to 3A and Comparative Examples 1A to 4A were used as test samples, and a push-pull gauge (model: RX-20, purchased from Homda Technology) was used to measure the pulling force which was required to remove the layer which was formed by the solidified water-based ink from the PVC film. The results are shown in Table 2.

As shown in Table 2 below, the pulling forces of the printing films of Examples 1A to 3A were all greater than 6 kg, so these printing films met the industry standard for plastic flooring.

The experimental results of Test Example 3 have shown that the pulling forces of the printing films of Examples 1A to 3A were all greater than 6 kg, so the printing films of Examples 1A to 3A made of the water-based inks of Examples 1 to 3 could maintain a considerable level of adhesion and the layer formed by the solidified water-based ink were not easily removed from the PVC film, thus being suitable for plastic flooring.

Test Example 4: Tacky Level

In this test example, an area of 1 meter (m)*500 m of each of the printing films of Examples 1A to 3A and Comparative Examples 1A to 4A was used as a test sample. These test samples were rolled to make the surface of the PVC film applied with the water-based ink touch the other surface of the PVC film not applied with the water-based ink. Afterwards, the rolled test samples were placed in an environment with a pressure of 0.2 MPa, a humidity of 65%, and a temperature of 30° C. for 3 days. After that, the test samples were unrolled to evaluate the tacky level of the test samples. The detailed evaluation process was described as follows.

After the test samples were unrolled and became flat, the surface not originally applied with the water-based ink was examined by an evaluator. When this surface had an area stained with the water-based ink equal to or less than 5% of the total area of the test sample, the tacky level was low and it was marked as "low" in Table 2. When the stained area was larger than 5% and less than or equal to 20% of the total area of the test sample, the tacky level was moderate and it was marked as "moderate" in Table 2. When the stained area was more than 20% of the total area of the test sample, the tacky level was high and it was marked as "severe" in Table 2.

As shown in Table 2 below, the tacky level of each of the printing films of Examples 1A to 3A was at least moderate. In particularly, the tacky level of the printing film of Example 3A was low. Thus, the printing films of Examples 1A to 3A were suitable for plastic flooring. On the contrary, the tacky level of each of the printing films of Comparative Examples 1A and 2A was high, so the printing films of Comparative Examples 1A and 2A were not suitable for plastic flooring.

TABLE 2

Properties of water-based inks of Comparative Examples 1 to 4 (C1 to C4) and Examples 1 to 3 (E1 to E3) and printing films of Comparative Examples 1 to 4 (C1A to C4A) and Examples 1A to 3A (E1A to E3A)

| Water-based Inks | | Printing films | | | |
| --- | --- | --- | --- | --- | --- |
| Sample No. | Number of Bubbles | Sample No. | Dryness | Pulling Force (kg) | Tacky Level |
| C1 | more | C1A | X | 9.3 | severe |
| C2 | more | C2A | X | 8.9 | severe |
| C3 | less | C3A | X | 8.6 | moderate |
| C4 | less | C4A | X | 8.3 | moderate |
| E1 | less | E1A | Δ | 8.2 | moderate |
| E2 | less | E2A | ○ | 8.0 | moderate |
| E3 | none | E3A | ○ | 8.0 | low |

Based on the results of Test examples 1 to 4, it is clear that, by controlling the compositions of the water-based inks, the printing films produced by the water-based inks can maintain a considerable level of adhesion and have characteristics of drying easily, low tacky level, and good color printing quality, thus being suitable for plastic flooring.

Even though numerous characteristics and advantages of the present invention have been set forth in the foregoing description, together with details and features of the invention, the disclosure is illustrative only. Changes may be made in the details within the principles of the invention to the full extent indicated by the broad general meaning of the terms in which the appended claims are expressed.

What is claimed is:

1. A water-based ink, comprising a water-based paint pigment, water, a resin, a desiccant, a defoamer, a hardener, a color fixative, and a dispersant, wherein, based on the total volume of the water-based ink, the water-based paint pigment has an amount of from 10 vol % to 15 vol %, the water has an amount of from 60 vol % to 67 vol %, the resin has an amount of from 6 vol % to 12 vol %, the desiccant has an amount of from 5 vol % to 10 vol %, the defoamer has an amount of from 3 vol % to 8 vol %, the hardener has an amount of from 4 vol % to 9 vol %, the color fixative has an amount of from 2 vol % to 7 vol %, and the dispersant has an amount of from 3 vol % to 9 vol %; the resin is a combination of waterborne polyurethane and poly(methyl methacrylate); the desiccant includes a drier, a water-based alkyd resin, titanium dioxide, an anti-blocking agent and a wetting and dispersing agent.

2. The water-based ink as claimed in claim 1, wherein the defoamer includes polyether siloxane.

3. The water-based ink as claimed in claim 1, wherein the hardener includes polyamide.

4. The water-based ink as claimed in claim 1, wherein, based on the total volume of the water-based ink, water-based paint pigment has an amount of from 10 vol % to 13 vol %, the water has an amount of from 60 vol % to 65 vol %, the resin has an amount of from 6 vol % to 10 vol %, the desiccant has an amount of from 5 vol % to 7 vol %, and the defoamer has an amount of from 3 vol % to 5 vol %.

5. The water-based ink as claimed in claim 4, wherein, based on the total volume of the water-based ink, the hardener has an amount of from 4 vol % to 6 vol %, the color fixative has an amount of from 2 vol % to 5 vol %, and the dispersant has an amount of from 3 vol % to 5 vol %.

6. A printing film, produced by the water-based ink as claimed in claim 1.

7. The printing film as claimed in claim 6, wherein a pulling force of the printing film is more than 6 kilograms and less than 8.3 kilograms.

8. The printing film as claimed in claim 6, wherein a pulling force of the printing film is more than or equal to 7 kilograms and less than 8.3 kilograms.

* * * * *